United States Patent [19]

Tausig

[11] 4,314,784
[45] Feb. 9, 1982

[54] SEAFLOOR ATTACHMENT BOLTS

[75] Inventor: Wayne R. Tausig, Oxnard, Calif.

[73] Assignee: The United States of America as represented by the Secretary of the Navy, Washington, D.C.

[21] Appl. No.: 152,456

[22] Filed: May 22, 1980

[51] Int. Cl.³ .............................................. F16B 13/06
[52] U.S. Cl. ........................................ 411/57; 411/70; 411/361
[58] Field of Search ...................... 411/57, 60, 61, 70, 411/71, 55, 49, 65, 44, 361

[56] References Cited

U.S. PATENT DOCUMENTS

| | | | |
|---|---|---|---|
| 1,031,462 | 7/1912 | Paine | 411/57 |
| 2,531,048 | 11/1950 | Huck | 411/361 |
| 3,139,786 | 7/1964 | Ardell | 411/361 |
| 3,296,919 | 1/1967 | Williams | 411/65 X |
| 3,515,028 | 6/1970 | Patton | 411/70 |
| 3,709,089 | 1/1973 | Seetaram | 411/61 |
| 3,766,819 | 10/1973 | Giannuzzi | 411/60 |
| 4,094,223 | 6/1978 | Fischer | 411/44 |

Primary Examiner—Ramon S. Britts
Attorney, Agent, or Firm—Richard S. Sciascia; J. M. St. Amand; William C. Daubenspeck

[57] ABSTRACT

A fastener assembly for securing structures to the seafloor including a shaft of circular cross-section having a frusto-conically shaped head on a leading end for insertion into a prepared borehole and a mandril section at the other end having annular grooves around its perimeter. An expansible sleeve is disposed around the shaft in interference fit with the borehole so that when the shaft is pulled upward, the head will force the expansible member to expand against the sides of the borehole. The shaft is disposed with the grooved section extending through an aperture in a workpiece and a malleable collar is positioned around the shaft resting on the workpiece. A conventional blind riveting installation tool may be used to pull the shaft upward to engage the expansible sleeve in the borehole and to swage the malleable collar to the grooved shaft against the workpiece.

2 Claims, 4 Drawing Figures

SEAFLOOR ATTACHMENT BOLTS

BACKGROUND OF THE INVENTION

The present invention relates generally to fasteners and, more particularly, to fasteners for securing structures to a rock, coral, or sandy-bottom seafloor. The present invention is especially directed to seafloor attachment bolts for securing split pipe armor for underwater cables to the seafloor.

U.S. Pat. Nos. 4,026,184 and 4,056,037 illustrate expansion-type anchor bolts which are similar to those commonly used for attaching structures to the seafloor. In the typical expansion-type anchor bolt, the shaft has a frusto-conically shaped end for insertion into a pre-drilled borehole and a threaded end. A collar is loosely disposed around the shaft above the frusto-conically shaped end. When a nut is tightened on the threaded end, the shaft is withdrawn from the borehole relative to the collar. The resulting movement of the frusto-conically shaped end into the collar spreads and expands the collar against the side of the borehole thereby holding the bolt in place.

The prior art expansion-type anchor bolt has two main disadvantages when used with subsea piping systems, both being related to the threaded bolt/nut installation technique. First, the installation requires a torquing device such as a wrench which is not easily manipulated by a diver. Second, threaded connections are subject to vibration loosening caused by subsea wave action. The life expectancy of the subsea pipe system in which the anchor bolts may be used is 20 years. Threaded fasteners usually vibrate loose within a year after installation in such an environment. There is therefore a need for a seafloor attachment bolt which may be easily installed by divers and which will not be loosened by subsea wave action.

In the art of blind fasteners, a push-pull installation technique is often used in joining a plurality of sheets together as exemplified by U.S. Pat. No. 3,792,933. Typically, a rivet is inserted through apertures in the sheets so that the head of the rivet seats adjacent one side of the sheets. Through the use of a special tool, a pushing force is applied to swage a malleable collar to a threaded or grooved portion of the rivet on the other side of the sheets. At the same time, a pulling force is applied to the rivet to pull the sheets tightly together.

SUMMARY OF THE INVENTION

It is an object of the present invention to provide a seafloor attachment bolt which may be easily installed by divers.

Another object of the present invention is to provide a seafloor attachment bolt which does not require torque for installation.

A further object of the present invention is to provide a seafloor attachment bolt which is resistant to vibration loosening due to subsea wave action.

Another object of the present invention is to provide a seafloor attachment bolt which may be installed with a push-pull installation technique.

Still another object of the present invention is to provide a seafloor attachment bolt in which only one operation is required to both set the bolt in the seafloor and to secure the structure to the bolt.

The present invention combines the push-pull installation technique of blind fasteners with the anchoring techniques of the expanding-type anchor bolt. The seafloor attachment bolt includes a shaft with a frusto-conically shaped head on an end to be inserted into a borehole and a grooved section on the other end. An expandable annular member is disposed above the frusto-conically shaped head in the borehole. The upward motion of the annular member on the shaft is constrained so that when the shaft is pulled upward, the frusto-conically shaped head will force the annular member to expand against the sides of the borehole. The shaft is disposed with the grooved section extending through an aperture in a workpiece and a malleable collar is positioned around the shaft resting on the workpiece. A conventional blind riveting installation tool may be used to pull the shaft upward to engage the annular member in the borehole and to swage the malleable collar to the grooved shaft against the workpiece, thereby anchoring the bolt in the seafloor and securing the workpiece in place.

Other objects and many of the attendant advantages will be readily appreciated as the subject invention becomes better understood by reference to the following detailed description, when considered in conjunction with the accompanying drawings, wherever like reference characters designate like or corresponding parts throughout the several views.

BRIEF DESCRIPTION OF THE PREFERRED EMBODIMENT

Figure 1:
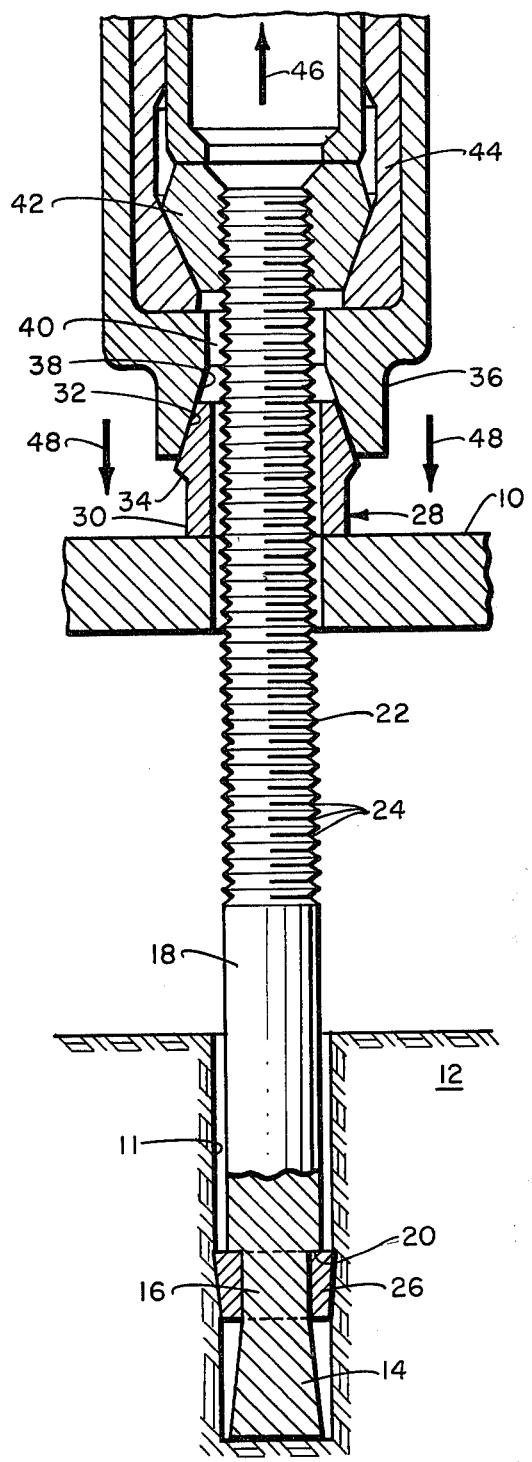
FIG. 1 is a cross-sectional view of the seafloor attachment bolt of the present invention in the unanchored condition with the bolt shown passing through the flange of a split pipe into a borehole and an installation tool shown disposed for final installation.

Referring now to FIG. 1, the seafloor attachment bolt is shown extending through a flange 10 of a split pipe (see FIG. 2) and disposed in a borehole 11 in the ocean bottom 12. The attachment bolt includes a shaft member of cylindrical cross-section having a frusto-conically shaped head 14 on the end of the shaft inserted in the borehole 11. The frusto-conically shaped head 14 diverges outwardly from a waist section 16 to the end of the shaft. At the other end of the waist section 16, the shaft member expands to a shank section 18 forming an annular shoulder 20. The shank section 18 leads to a mandril section 22 which extends to the end of the shaft. The mandril section 22 has annular grooves 24 to form a serrated edge.

A sleeve 26 having an inner diameter slightly larger than the diameter of the waisted section 16 and smaller than the diameter of the shank section 18 is disposed around the waisted section in the borehole 11. The sleeve 26 has a longitudinally gap 27 (see FIG. 2) to allow the forced expansion of the sleeve diameter.

The outer diameter of the sleeve 26 which is chosen to provide an interference fit with the borehole 10 is tapered slightly toward the head 14 in order to facilitate insertion of the bolt into the borehole 11. During insertion of the bolt, friction between the sleeve 26 and the borehole 11 will force the sleeve upward against the annular shoulder 20 which then holds it in place.

A malleable collar 28 is positioned around the mandril section 22 of the bolt with the collar resting on a top surface of the split pipe flange 10. The collar 28 is adapted to be swaged into the grooves 24 of the mandril section 22 so as to lock the collar thereto and form a head against the flange 10. Prior to swaging, as shown in FIG. 1, the inner diameter of the collar is slightly larger than the diameter of the serrated mandril portion 22 to allow a slight contraction of the collar 28 without interferring with axial motion of the shaft member.

The collar 28 is originally formed with a cylindrical outer surface 30 extending inward from the end of the collar against the flange 10. At the other end, the outer surface of the collar 28 diverges from an initial diameter somewhat smaller than the diameter at surface 30 to a diameter larger than the diameter of surface 30, forming a frusto-conical surface 32. The frusto-conical surface 32 and the cylindrical surface 30 are joined by a tapered shoulder 34.

The seafloor attachment bolt may be set by a riveting mechanism similar to that shown and described in U.S. Pat. No. 2,754,703. A functionally similar mechanism is illustrated in FIG. 1 herein, and includes an anvil 36 having a frusto-conical inner surface 38 complementary to the frusto-conical outer surface 32 of collar 28. An annular opening 40 is provided between the inner surface of the anvil 36 behind the frusto-conical portion 38 to allow the collar to extrude through the anvil. Locking jaws 42 are provided and these are adapted to be contracted by collet 44.

Figure 2:
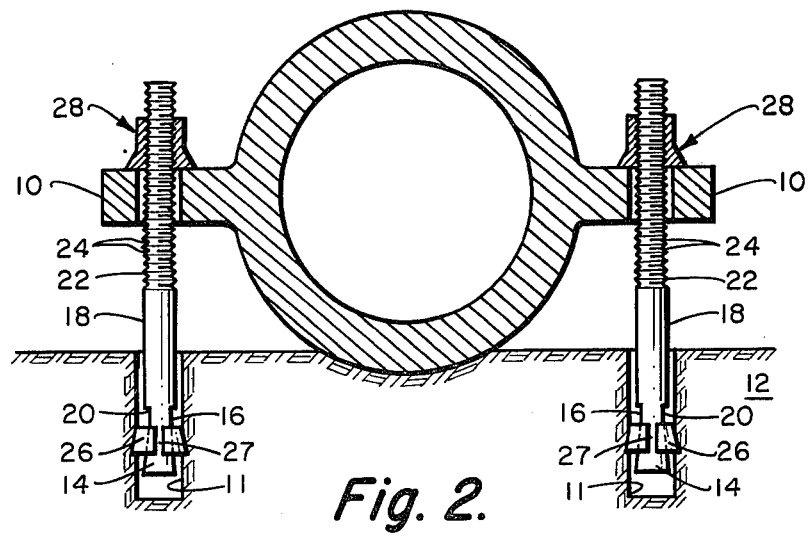
FIG. 2 illustrates the use of the attachment bolt of FIG. 1 in securing a split pipe armor to the seafloor, the bolt being shown in the anchored condition.

In operation, the mandril section 22 of the shaft is inserted into the riveting mechanism between the jaws 42 with the anvil 36 abutting the malleable collar 28. When the collet 44 is pulled as indicated by arrow 46 and the anvil is pushed as indicated by arrow 48, the jaws 42 will be moved inward to engage the grooves in the mandril and the anvil will be pressed against the frusto-conical surface 32 of the collar 28. Additional upward force on the collet 44 causes the shaft of the bolt to be pulled upward in the borehole 11. Because the sleeve 26 is held in interference fit in the borehole 11, the upward movement of the shaft pulls the frusto-conically shaped head 14 into the sleeve. This forces the sleeve 26 to expand (gap 27 widens to permit the expansion) against the sides of the borehole 11 and sets the bolt in the seafloor as shown in FIG. 2.

As the shaft is pulled, the pushing force is applied through the anvil surface 38 to the frusto-conical surface 32 of the collar 28. As the pull on the shaft and the pushing force increases, the malleable collar 28 (which is constrained between the anvil 36 and the flange 10) will be swaged radially inwardly about the grooved mandril section between the anvil 36 and the flange 10. The collar 28 is thereby locked in position on the shaft above the flange 10. FIG. 2 illustrates the split pipe armor 10 secured to the seafloor by two of attachment bolts, the bolts being shown in the anchored condition with the malleable collars 28 swaged about the mandril section of the shaft. Swaging the collar 28 about the annular groove provides a connection which is resistant to vibration loosening since grooves 24 are not threaded, but are annular, as aforementioned.

Figure 3:
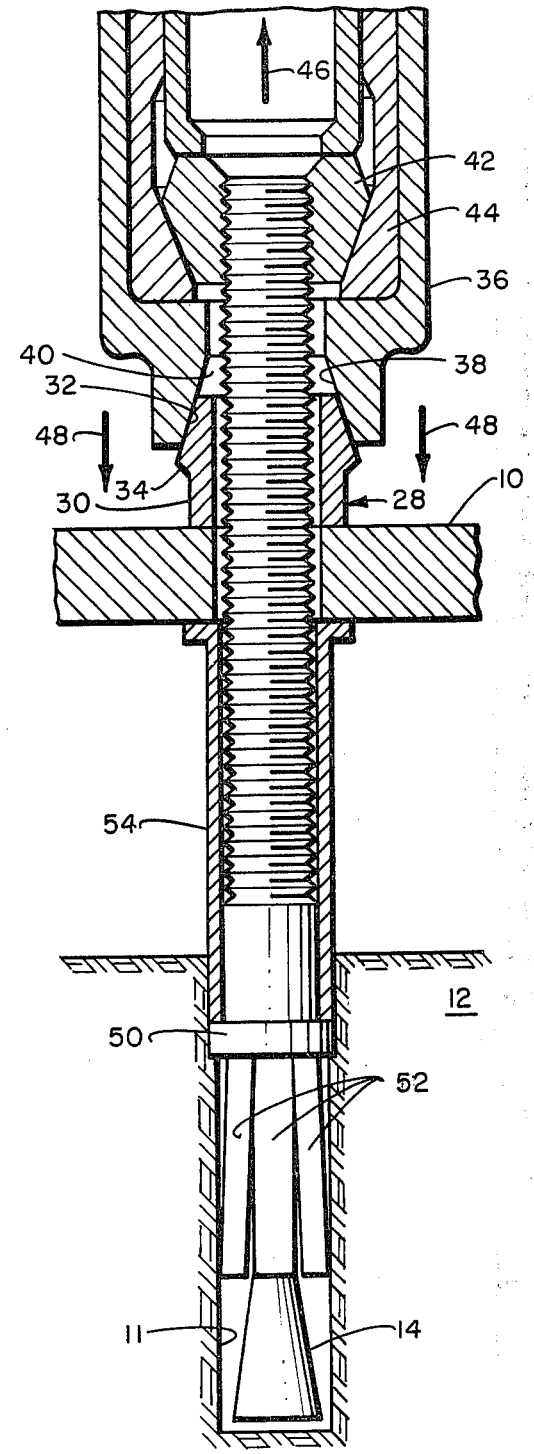
FIG. 3 is a cross-sectional view of a second embodiment of the present invention in which the anchoring mechanism is of the type commonly used for coral or sandy bottom installations.

Referring now to FIG. 3, there is shown a second embodiment of the present invention employing an anchoring structure suitable for use in coral or sand-bottom installations. This embodiment is identical to the embodiment of FIG. 1 except that the sleeve 26 is replaced by a cylindrical ring member 50 having a plurality of rectangular fingers 52 which are disposed in a cylindrical arrangement around the shaft of the bolt immediately above the frusto-conically shaped head 14. Upward movement of the ring 50 is prevented by a reaction spacer 54 which is a cylindrical sleeve surrounding the shaft member extending between the lower surface of the split pipe flange 10 and the top of the ring 50. The reaction spacer 54 must be placed on the bolt shaft before the flange 10 is placed onto the bolt.

Figure 4:
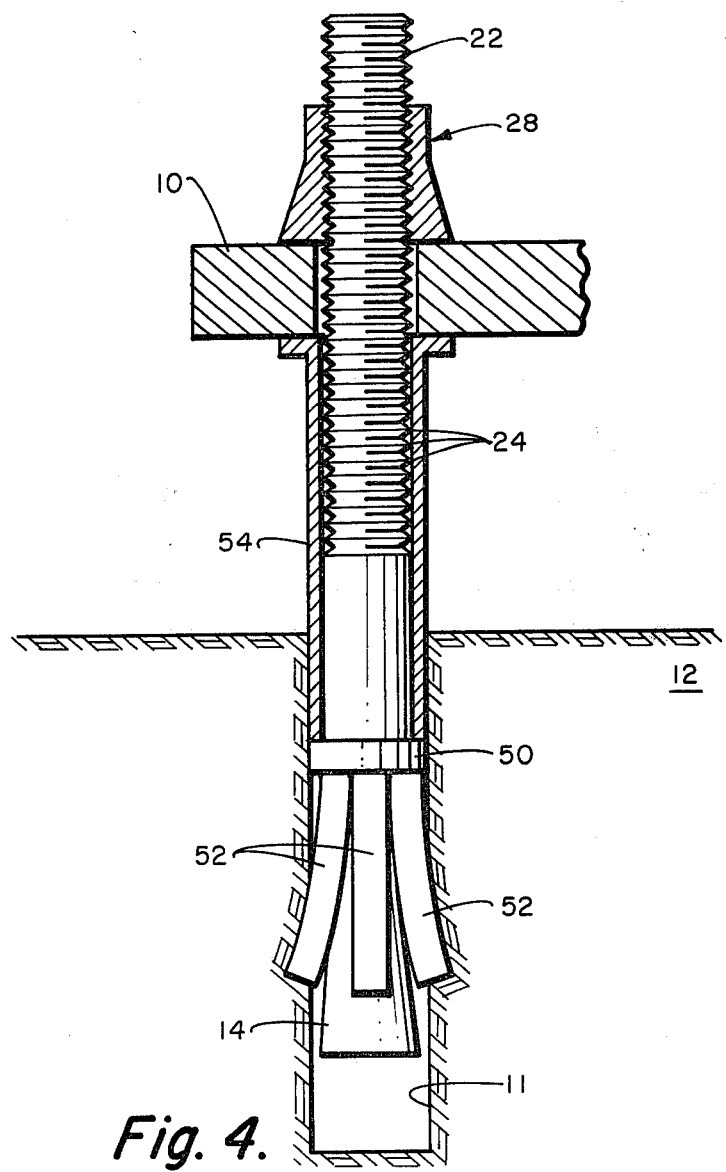
FIG. 4 illustrates the embodiment of FIG. 3 in the anchored condition.

The embodiment of FIG. 3 operates in a manner similar to the embodiment of FIG. 1 and may be installed by the same riveting mechanism. The mandril section 22 of the shaft is inserted into the riveting mechanism between the jaws 42 with the anvil 36 abutting the malleable collar 28. The riveting mechanism is used to simultaneously exert a pulling force on the shaft and a pushing force on the collar 28. The pulling force causes upward movement of the shaft so that the frusto-conically shaped head 14 is pulled upward into the cylindrical ring member 50 forcing fingers 52 outward against the sides of the borehole 11, thereby setting the shaft in place as shown in FIG. 4. The spacer 54 prevents upward movement of the ring member 50 during the operation. As the pulling force on the shaft and the pushing force on the anvil increase further, the malleable collar 28 will be swaged radially inward about the grooved mandril section 22. The collar 28 pressing against the flange 10 will then maintain the upward tension on the shaft and hold the flange in place between the collar and the spacer 54.

Obviously many modifications and variations of the present invention are possible in the light of the above teachings. It is therefore to be understood that within the scope of the appended claims the invention may be practiced otherwise than as specifically described.

What is claimed is:

1. A fastener assembly for securing structures to the seafloor, said fastener assembly being used in a prepared borehole in said seafloor and installable with a push-pull type riveting mechanism, and which comprises:

a. a unitary shaft of circular cross-section having a frusto-conically shaped head on a leading end for insertion into the borehole, said frusto-conically shaped head widening from a first diameter to a second diameter at the end of the shaft, said shaft including a non-threaded mandril section at the other end having annular grooves which form serrated edges around its perimeter; said shaft also including a waist section immediately adjacent said frusto-conically shaped head, said waist section being of said first diameter, said shaft further including a shank section between said mandril section and said waist section and having a diameter larger than said first diameter;

b. expansible means disposed around the waist section of said shaft above said frusto-conically shaped head for insertion into the borehole, said expansible means being in interference fit with said borehole; said expansible means including a cylindrical ring having a plurality of fingers in a cylindrical arrangement disposed with said fingers directed toward said frusto-conical head; the outer diameter of said cylindrical ring above said plurality of fingers being greater than the diameter of said shank section and the inner diameter of said cylindrical ring being smaller than the diameter of said shank section; the outer diameter of said expansible means in the area of said plurality of fingers being less than the outer diameter of said cylindrical ring;

c. a cylindrical reaction spacer disposed about said shaft between the bottom surface of said structure and said expansible means; the end of said cylindrical reaction spacer adjacent said expansible means preventing said expansible means from sliding past said cylindrical spacer on said shaft and operating to push said expansible means downward onto said frusto-conically shaped head by action of said riveting mechanism pulling on said unitary shaft;

d. a malleable collar adapted to be swaged onto said mandril section by said riveting mechanism; when the frusto-conically shaped head of said shaft and said expansible means are inserted into the borehole, and the mandril section of the shaft is disposed through an aperture in said structure and the malleable collar is disposed against the top surface of the structure, said shaft being operable to be pulled by said riveting mechanism without torquing to draw the frusto-conical head into said expansible means to cause said expansible means to expand so that an anchoring grip is obtained on the wall of the borehole, and said riveting mechanism simultaneously pushing on said malleable collar operating to swage said collar to the grooved mandril to maintain a non-slip anchoring grip.

2. Apparatus as recited in claim 1 wherein said malleable collar includes a frusto-conically shaped surface against which said riveting mechanism pushes to swage said collar about said mandril section.

* * * * *